(12) United States Patent
Guter

(10) Patent No.: US 10,507,533 B2
(45) Date of Patent: Dec. 17, 2019

(54) DRILL

(71) Applicant: Kennametal Inc., Latrobe, PA (US)

(72) Inventor: Tim Guter, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/593,002

(22) Filed: May 11, 2017

(65) Prior Publication Data

US 2017/0326653 A1 Nov. 16, 2017

(30) Foreign Application Priority Data

May 12, 2016 (DE) .......................... 10 2016 208 228

(51) Int. Cl.
*B23B 51/02* (2006.01)

(52) U.S. Cl.
CPC ........ *B23B 51/02* (2013.01); *B23B 2251/043* (2013.01); *B23B 2251/12* (2013.01); *B23B 2251/204* (2013.01); *B23B 2251/408* (2013.01); *B23B 2251/443* (2013.01); *Y10T 408/9097* (2015.01)

(58) Field of Classification Search
CPC .............. B23B 51/02; B23B 2251/443; B23B 2251/44; Y10T 408/909; Y10T 408/9097
USPC ........................................................ 76/108.6
See application file for complete search history.

(56) References Cited

U.S. PATENT DOCUMENTS

| | | | | |
|---|---|---|---|---|
| 465,392 | A * | 12/1891 | Shippee | B23B 51/02 408/230 |
| 3,598,500 | A * | 8/1971 | Oxford, Jr. | B23B 31/20 408/186 |
| 4,367,991 | A * | 1/1983 | Grafe | B23B 27/141 408/186 |
| 5,486,075 | A | 1/1996 | Nakamura | |
| 2005/0249562 | A1* | 11/2005 | Frejd | B23B 51/02 408/230 |
| 2006/0037786 | A1* | 2/2006 | Takikawa | B23B 51/0018 175/394 |
| 2010/0092259 | A1* | 4/2010 | Borschert | B23B 51/02 408/230 |

(Continued)

FOREIGN PATENT DOCUMENTS

| | | |
|---|---|---|
| DE | 2416157 C2 | 8/1982 |
| DE | 102013202578 B4 | 8/2014 |
| JP | 2013166232 A * | 8/2013 |

OTHER PUBLICATIONS

Apr. 13, 2017 First office action.

*Primary Examiner* — Alan Snyder
*Assistant Examiner* — Yasir A Diab
(74) *Attorney, Agent, or Firm* — Matthew S. Bedsole

(57) ABSTRACT

The drill comprises a base body, which extends in the axial direction along an axis of rotation and rotates about the axis of rotation in a direction of rotation during operation. Into the base body are incorporated flutes and between consecutive flutes is formed a rear surface, which extends, in relation to the direction of rotation, from a leading flute to a trailing flute. On the rear surface in the region of the leading flute, a guide chamfer and a support chamfer spaced apart from it in the direction opposite the direction of rotation are formed, wherein the support chamfer, as radially outermost region, forms a support edge for a merely linear support.

9 Claims, 2 Drawing Sheets

(56) References Cited

U.S. PATENT DOCUMENTS

2011/0103910 A1\* 5/2011 Krenzer .................. B23B 51/02
408/229
2012/0183367 A1\* 7/2012 Kress ..................... B23B 51/02
408/145

\* cited by examiner

DRILL

RELATED APPLICATION DATA

The present application claims priority pursuant to 35 U.S.C. § 119(a) to German Patent Application Number DE1020162082280 filed May 12, 2016 which is incorporated herein by reference in its entirety.

FIELD

The invention relates to a drill for machining workpieces.

BACKGROUND

Drills routinely comprise a base body extending in the axial direction along an axis of rotation. On the end surface, the drill comprises a drill face with cutting edges, which usually extend to cutting corners, which define a nominal radius of the drill. Flutes for removing the chips produced during drilling are usually incorporated into the base body. Starting from the cutting corner, a minor cutting edge usually extends along the respective flute.

There are basically different types of drills, such as one-piece drills, in particular solid carbide drills, or even modular drills, in which a cutting element, such as a drill tip, or even cutting plates are usually reversibly exchangeably mounted on a base body.

For a dimensional stability as high as possible of a drill hole produced using the drill, a reliable guidance and true-running accuracy of the drill is of particular importance. In order to reliably produce a drill hole with a defined diameter, drills usually comprise guide chamfers and additionally often times also support chamfers, which are formed on a rear surface of the drill. "Rear surface" generally refers to the part of the drill between two consecutive flutes in the circumferential direction. The rear surface therefore extends from a leading flute to a trailing flute in relation to a direction of rotation of the drill during operation.

At the edge of the rear surface toward the leading flute, the so-called guide chamfer is usually formed, which extends along the flute. This edge toward the leading flute can be designed as a minor cutting edge.

Toward the trailing flute, an additional support chamfer is often times arranged on the rear surface. Both the guide chamfer and typically also the support chamfer extend in the radial direction to the nominal radius and in the direction of rotation usually in an arc shape over a few angular degrees.

The guide and support chamfers however necessarily result in a friction between the respective chamfer and the drill hole wall, which in particular leads to a heating and hence a thermal load and thus to an early wear of the drill.

SUMMARY

Proceeding therefrom, the invention is based on the task of specifying a drill with high true-running accuracy in the production of a drill hole, which drill exhibits only minor friction during operation and hence only a minor thermal load.

The task is solved according to the invention by a drill having the features of claim 1. In order to ensure a true-running accuracy as high as possible during the production of a drill hole, the drill comprises on its rear surface a guide chamfer as well as a support chamfer spaced apart from it. In this case, the guide chamfer is usually formed directly adjacent to a leading flute, i.e. along an edge toward the leading flute. The support chamfer is formed in a rearward region of the rear surface toward the trailing chamfer and in particular in the last third of the rear surface. Between the guide chamfer and the support chamfer, a continuous clearance without additional support or guide chamfers is usually formed with a reduced radius.

In order to continue to keep the friction and hence the thermal load as low as possible, the support chamfer comprises only a support edge as the radially outermost region so that a merely linear contact to the drill hole wall occurs during operation. The drill is therefore only supported linearly via the support chamfer. When viewed in cross section transverse to the axis of rotation, the support chamfer therefore forms a support point, with which the support chamfer, when viewed in cross-section, effectively punctually abuts against the drill hole inner wall.

This design is based on the consideration that a linear contact is sufficient for the support in order to ensure the desired high true-running accuracy, in particular such that the support edge is not supported two-dimensionally by the drill hole wall during operation.

As a result of the small support surface compared to traditional support chamfers, the pressing force per unit of area is increased, whereby an at least minor elastic penetration of the support edge into the drill hole wall can occur. This means that an elastic deformation of the drill hole inner wall can occur as a result of the support edge.

In contrast to traditional support chamfers, which usually extend in the direction of rotation or in the circumferential direction over an angular range of several angular degrees, the support edge only extends over an angular range of significantly less than 1°, such as only up to 0.5°. This means that the support chamfer only has the maximum radius, in particular the nominal radius, over this small angular range.

Advantageously, the support chamfer respectively falls off both in the leading and trailing direction relative to the support edge so that it thus only has its maximum radius at the support edge. A leading surface region and a trailing surface region, which respectively rise toward the support edge, respectively adjoin the support chamfer. The trailing surface region in relation to the direction of rotation is in this case preferably a ground surface. This trailing surface region is ground during production effectively from behind toward the leading surface region.

Advantageously, the leading surface region and the trailing surface region are oriented toward each other at an obtuse angle. The support edge is as a result overall designed to be very dull and precisely not sharp-edged. This prevents grooves from being produced in the drill hole inner wall during drilling. Overall, it is ensured thereby that the support edge only abuts obtusely against the drill hole inner wall and that a sharp edge is precisely not formed. The term "support edge" is therefore not to be understood within the meaning of a sharp edge. Rather, it is thereby only clarified that it is a linear contact in the axial direction of the drill during drilling operation.

Expediently, the obtuse angle in this respect is in the range between 130° and 175° and in particular about 160°.

The aim is basically for the support edge, i.e. the region with the maximum radius of the support chamfer, such as the nominal radius, to only extend over an angular range as small as possible. With respect to manufacturing technology, this is achieved by a grinding of the trailing surface region from behind. In doing so, the grinding wheel is moved successively toward the leading surface region, namely preferably until the two surface regions abut against each other to form the support edge. The abutting edge or support edge itself is for example additionally rounded, in particular round brushed or round blasted. Overall, when viewed in cross section, the leading and the trailing surface region therefore form a triangular surface with a possibly rounded tip of the triangle, which forms the support edge.

Within the scope of the grinding tolerances during the manufacturing process, a small remaining width of the support edge can also be formed. However, this remaining width extends in the direction of rotation or in the circumferential direction as already mentioned above at most over an angular range of less than one degree.

As a result of this measure, the support edge overall has a radius that maximally and preferably exactly corresponds to the nominal radius.

Depending on the grinding process for producing the support edge, the support edge is also located, for example, on a radius that is somewhat smaller than the nominal radius. In this case, the trailing surface region is even somewhat ground into the leading surface region so that the radial height of the support chamfer is thus reduced during the grinding of the trailing surface region.

In some prototypes, the nominal diameter or base body diameter tapers in the axial direction. In such a design, the nominal radius respectively refers to the maximum radius of the base body within a respective cross-sectional plane orthogonal to the axis of rotation. The nominal radius in this case is usually defined on the leading flute in the region of the guide chamfer.

The support edge preferably extends along the entire flute but at least over a multiple of the nominal radius.

In relation to the direction of rotation, the support edge is preferably spaced apart from the subsequent flute. The angular distance of the support edge to the subsequent flute in this case preferably amounts to several degrees, such as 5 to 20°.

In order to produce such a drill, a raw rod is first provided as usual and round ground to the nominal radius or nominal diameter. Thereafter, the grinding of the flutes typically occurs, wherein a rear surface remains between the flutes. The rear surface is subsequently ground so that initially a guide chamfer as well as a subsequent support chamfer form as usual. In order to produce the desired support edge, the support chamfer is now ground in an additional grinding step effectively from behind, i.e. starting from the trailing flute toward the leading flute, wherein the trailing surface region is formed thereby.

The grinding wheel is preferably guided toward the leading flute and the leading surface region such far that the two surface regions directly abut against each other. The abutting edge then forms the support edge. Overall, the desired obtuse triangle is formed thereby. Additionally, an edge rounding can be carried out on the support edge.

BRIEF DESCRIPTION OF THE DRAWINGS

An exemplary embodiment of the present invention is explained in greater detail below based on the figures. These figures show, partially in schematic illustrations.

DETAILED DESCRIPTION

Figure 1:
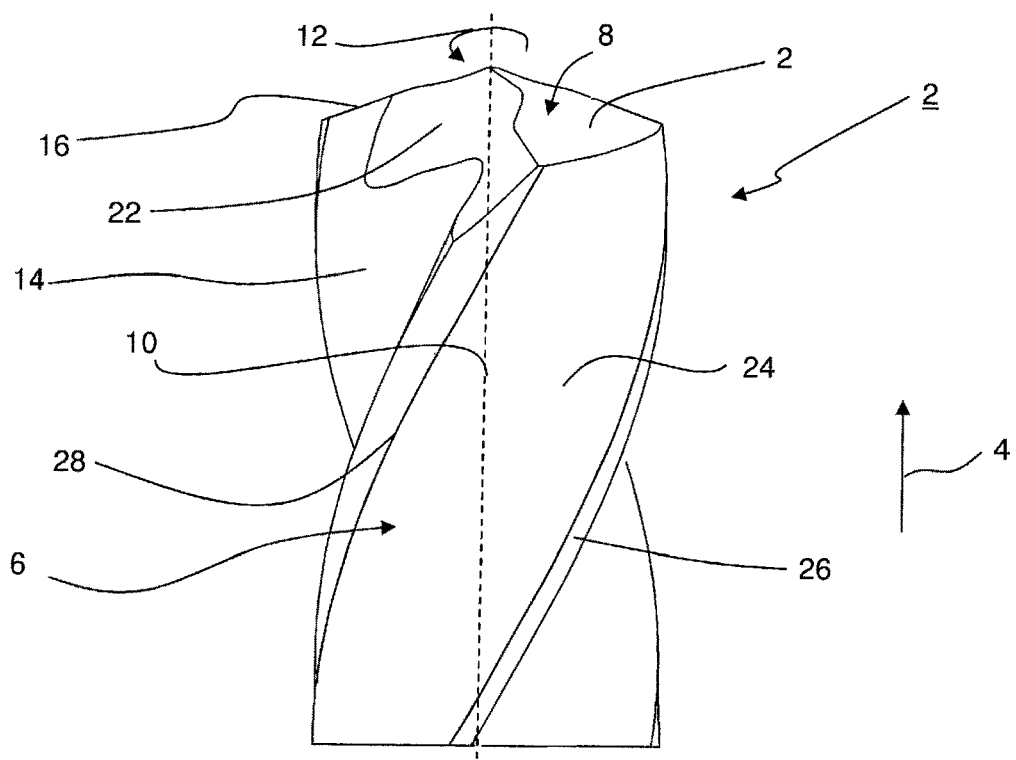
FIG. 1 a sectional lateral view of a drill illustrated schematically.

Without loss of generality, the exemplary embodiment of FIG. 1 illustrates a one-piece drill 2, in particular a carbide drill. The subsequent embodiments can however also be realized similarly in modular drilling tools and are not limited to a one-piece drill 2.

The drill 2 extends in the axial direction 4 and comprises a base body 6, on the end surface of which is formed a drill face 8. In this case, the drill 2 extends along an axis of rotation 10, about which the drill rotates in the direction of rotation 12 during operation.

The drill 2 furthermore comprises flutes 14 incorporated into the base body 6, which flutes extend in the shape of a coil in the exemplary embodiment. At its rearward subregion, the drill 2 usually comprises a clamping region, with which it can be clamped into a machine tool. A cutting region with the flutes 14 adjoins this clamping region toward the front in the axial direction 4.

The drill face 8 can altogether be designed differently; depending on the intended use, different grindings can for example be provided. In the exemplary embodiment, approximately a conical shell grinding is illustrated. Basically, the drill face shows major cutting edges 16, which extend outward toward a cutting corner 18. A so-called minor cutting edge 20, which extends along the flute 14, usually starts on the cutting corner 18. The major cutting edge 16 is respectively adjoined in the direction opposite the direction of rotation 12 by a free space, which usually falls off toward the rearward, subsequent flute 14 and transitions into it.

In the exemplary embodiment shown, a so-called point thinning 22 can also be seen, which is produced by a separate grinding step in order to taper a drill core in the region of the drill face 8.

Circumferentially, the base body 6 respectively comprises a rear surface 24 between the two consecutive flutes 14. In the direction opposite the direction of rotation 12, the cutting corner 18 and the minor cutting edge 20 is first adjoined by a guide chamfer 26, which usually extends, when viewed in cross section, approximately in an arc shape with a radius that corresponds to a nominal radius r0. The minor cutting edge 20 or the guide chamfer 26 in this case respectively define a position-dependent nominal radius r0 in a respective cross-sectional plane orthogonal to the axis of rotation 10. In the region of the cutting corner 18, the maximum nominal radius r0 defines a drill nominal radius r0.

In the direction opposite the direction of rotation 12, the rear surface 24 is first tapered so that a clearance between the nominal radius r0 and the rear surface 24 is formed. Toward the rearward region, i.e. toward the trailing flute 14, a support chamfer 28 is formed on the rear surface 24. In the exemplary embodiment, this support chamfer is arranged, when viewed in the direction opposite the direction of rotation 12, directly in front of the point thinning 22. Alternatively, it can also be arranged in the region of the point thinning 22 on the rear surface 24. The specific geometry of this point thinning is now explained in particular in connection with FIG. 3:

As can be seen therein, the support chamfer 28 comprises a leading surface region 30, which is oriented toward the cutting corner 18 or toward the minor cutting edge 20, i.e. toward the leading flute. The support chamfer 28 furthermore comprises a trailing surface region 32 toward the trailing flute 14. The two surface regions 30, 32 abut against each other to form a support edge 34. In doing so, the two surface regions 30, 32 are oriented toward each other at an obtuse angle $\alpha$, which is preferably larger than 130° and, for example, up to 175°. The radially outermost point of the support edge 34 has a radius r1, which preferably corresponds to the nominal radius r0 or is slightly smaller.

Figure 2:
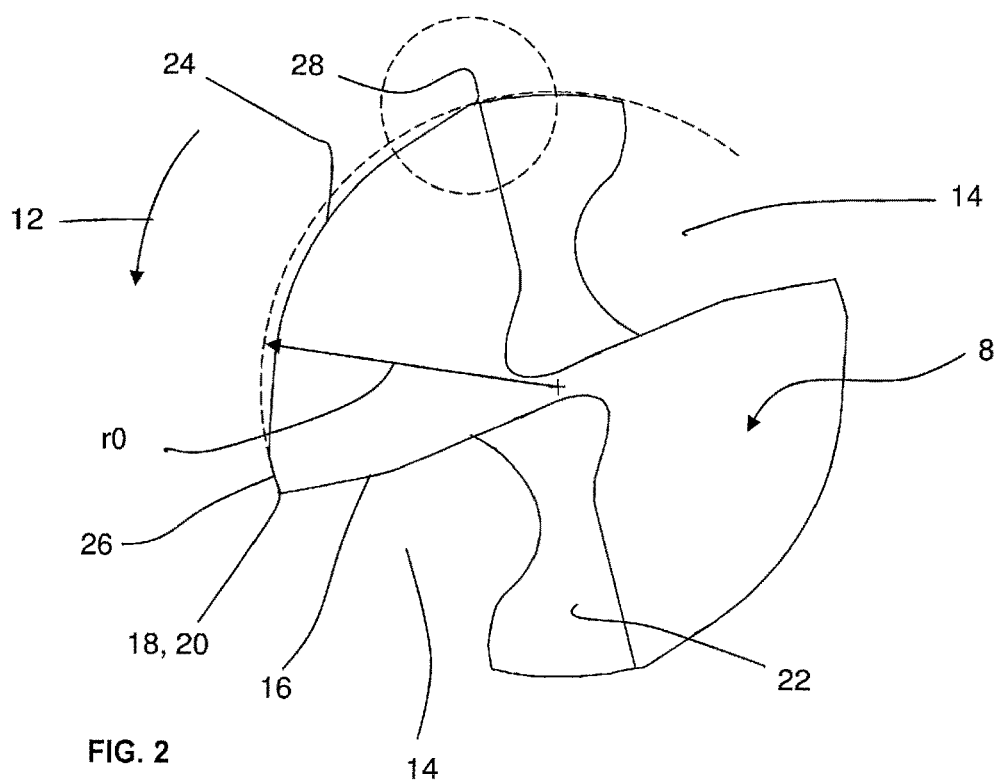
FIG. 2 a top view of a front end surface of the drill according to FIG. 1.
Figure 3:
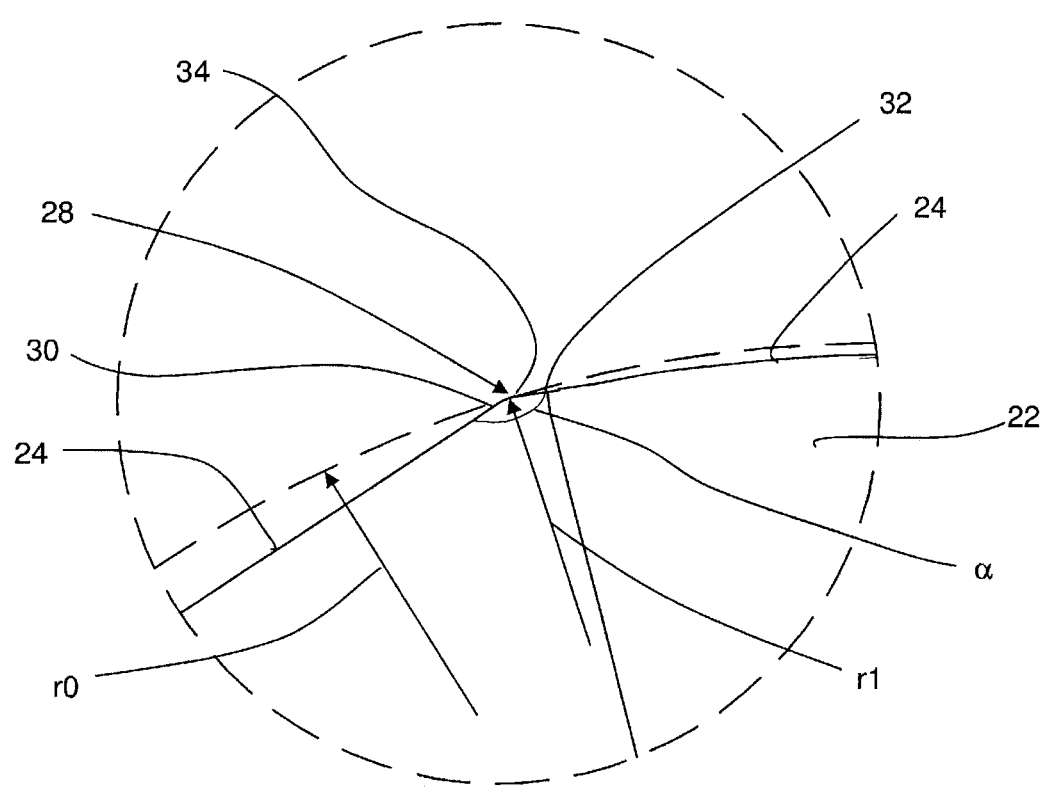
FIG. 3 an enlarged view of the region marked with a circle in FIG. 2.

As can be taken from the enlarged view of FIG. 3, the support edge 34 is not designed to be sharp-edged but rather rounded. Overall, the support chamfer 28 therefore has a very smooth geometry, wherein the radially outermost region in the direction opposite the axial direction 4 simultaneously ensures an effectively linear contact during drilling. The support edge 34 in this case extends parallelly to the flute 14 as can be seen in particular in FIG. 1. The view of FIG. 2 furthermore shows that the support chamfer 28 is spaced apart from the trailing flute 14 by more than 10°, in the exemplary embodiment by almost 30°. The support chamfer 34 is in particular formed approximately in an angular range, up to which the thinning point 22 is ground in.

As can be seen in particular in comparison to the dashed curve of the nominal radius r0, the specific design of the support chamfer 28 with the support edge 34 achieves only a point-shaped contact to the nominal radius r0 and thus to a drill hole wall of a drill hole during operation when viewed in cross section or in the top view. Both leading and trailing the support edge 34 is a considerable clearance between the circumferential contour of the base body 6, i.e. between the rear surface 24 and a circumferential line, with which the nominal radius r0 is reached.

During drilling, this results in only a linear contact to a drill hole wall being formed. Of particular importance is also the dull design of the support edge 34, which only results in a minor elastic avoiding of the drill hole wall, without furrows or grooves being produced in the drill hole wall.

As can be seen specifically in FIG. 2, the guide chamfer 26 is formed like a traditional guide chamfer, which, in comparison to the support edge 34, extends over a significantly larger angular range with at least largely constant nominal radius r0.

In order to form the support edge 34, the trailing surface region 32 is ground in from behind by a separate grinding step. In the process, a grinding wheel is guided toward the leading flute 14 and thus toward the leading surface region 30 until the leading surface region 30 is effectively reached. Depending on the grinding tolerance, the leading surface region 30 is either not reached exactly or a small amount of material is ground off of the leading surface region 30 such that the radius r1 is reduced so that it ultimately is smaller than the nominal radius r0.

The invention claimed is:

1. A drill comprising:
    a nominal radius (r0);
    a base body, which extends in the axial direction along an axis of rotation and rotates about the axis of rotation in a direction of rotation during operation;
    flutes, which are incorporated into the base body;
    a rear surface between consecutive flutes, which rear surface extends, in relation to the direction of rotation, from a leading flute to a trailing flute;
    a guide chamfer formed on the rear surface in the region of the leading flute as well as a support chamfer spaced apart from it in the direction opposite the direction of rotation, wherein the support chamfer, as radially outermost region, forms a support edge with point-shaped contact to the nominal radius for a merely linear support which extends in the axial direction.

2. The drill according to claim 1, in which the support chamfer comprises a leading surface region in the leading direction relative to the support edge in relation to the direction of rotation, which leading surface region rises in the radial direction toward the support edge, and comprises a trailing surface region in the trailing direction relative to the support edge, which trailing surface region falls off in the radial direction.

3. The drill according to claim 2, in which the leading surface region and the trailing surface region, when viewed in a cross section orthogonal to the axis of rotation, are oriented toward each other at an obtuse angle ($\alpha$).

4. The drill according to claim 3, in which the obtuse angle (0) is in the range of 130° to 175°.

5. The drill according to claim 2, in which the leading surface region and the trailing surface region, when viewed in a cross section orthogonal to the axis of rotation, abut against each other to form a support edge.

6. The drill according to claim 1, in which the support edge extends in the axial direction over a length, which corresponds to a multiple of the nominal radius (r0).

7. The drill according to claim 1, in which the support edge is spaced apart from the subsequent flute.

8. A method for producing a drill comprising an axis of rotation, about which it rotates in a direction of rotation during operation, wherein the method comprises the following steps:
    providing a raw rod;
    grinding in flutes, wherein a rear surface remains between the flutes;
    grinding of the rear surface so that a support chamfer is formed; and
    grinding off of a trailing region of the support chamfer in relation to the direction of rotation to form a trailing surface region of the support chamfer having a point-shaped contact to a nominal radius of the drill defining an axially extending linear support edge.

9. The method according to claim 8, in which the support chamfer comprises in relation to the direction of rotation a leading surface region rising toward the support edge, and the trailing surface region is ground toward the leading surface region such that the two region surfaces directly abut against each other at the support edge.

* * * * *